United States Patent [19]

Richter, Jr.

[11] Patent Number: 4,669,139

[45] Date of Patent: Jun. 2, 1987

[54] RECLINING BUNK FOR SLEEPER

[75] Inventor: Alvin C. Richter, Jr., Fort Wayne, Ind.

[73] Assignee: Navistar International Corporation, Chicago, Ill.

[21] Appl. No.: 771,446

[22] Filed: Aug. 30, 1985

[51] Int. Cl.⁴ .............................................. A61G 1/06
[52] U.S. Cl. .............................................. 5/118; 5/66; 5/508; 248/421; 248/588; 296/20
[58] Field of Search ................................. 5/118, 62-65, 5/66-69; 296/19, 20, 174; 248/584, 585, 588, 421

[56] References Cited

U.S. PATENT DOCUMENTS

| | | | |
|---|---|---|---|
| 3,371,359 | 3/1968 | Dome | 5/118 |
| 3,760,436 | 9/1973 | Zach et al. | 5/118 |
| 4,144,601 | 3/1979 | Anderson et al. | 5/118 |
| 4,196,483 | 4/1980 | Lefler et al. | 5/118 |
| 4,309,783 | 1/1982 | Cammack et al. | 5/66 X |
| 4,541,134 | 9/1985 | Black et al. | 5/118 |

Primary Examiner—Henry E. Raduazo
Assistant Examiner—R. Chilcot
Attorney, Agent, or Firm—F. David AuBuchon; Dennis K. Sullivan

[57] ABSTRACT

The present invention is a truck with an air powered and air cushioned multipositional reclining sleeper bed. The present invention provides increased comfort for the occupant of the sleeper compartment by utilizing the compressed air system of the truck to adjust the sleeper bed to the position desired and to cushion the ride of the sleeper occupant.

8 Claims, 5 Drawing Figures

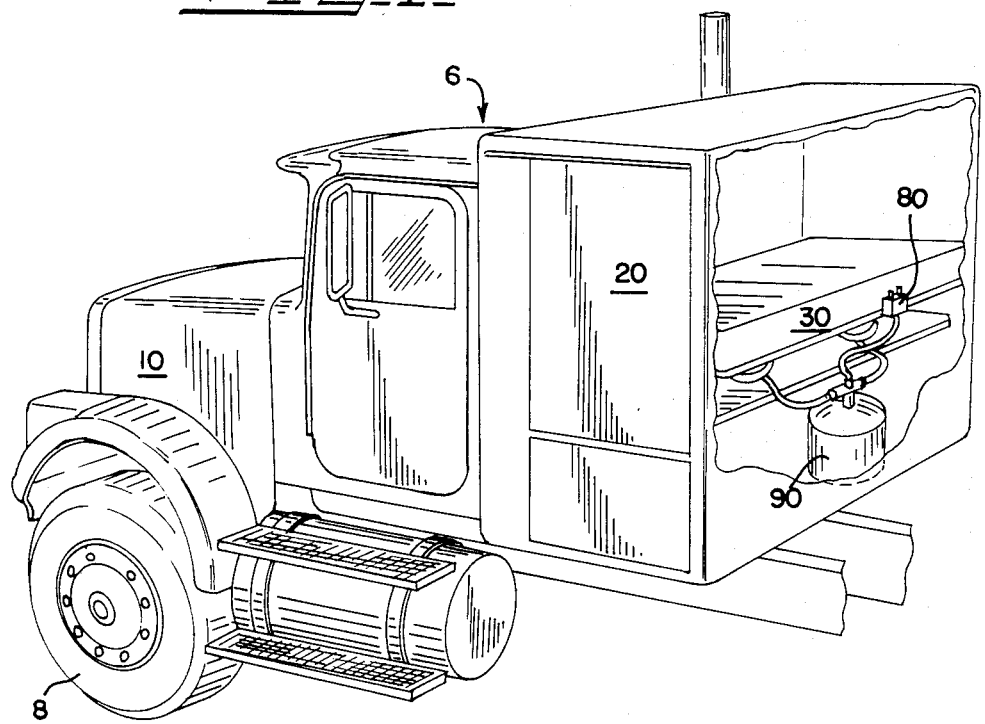

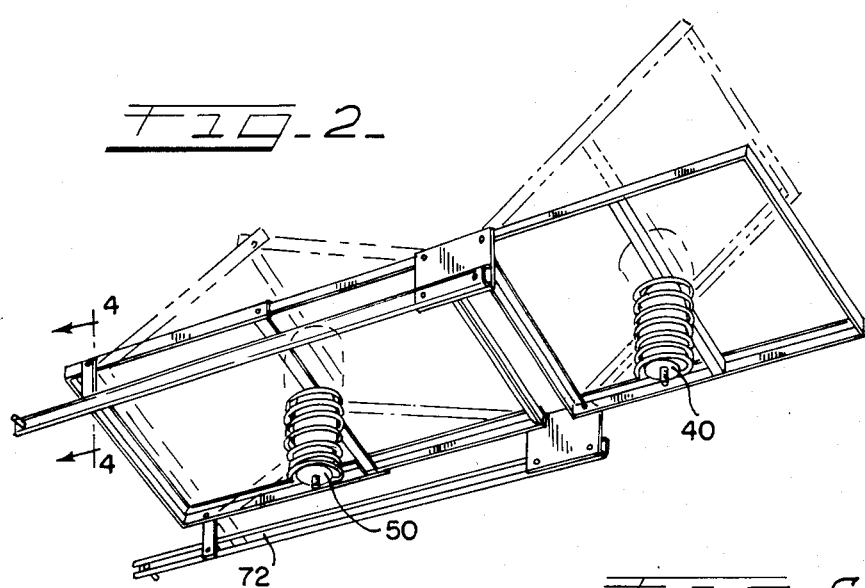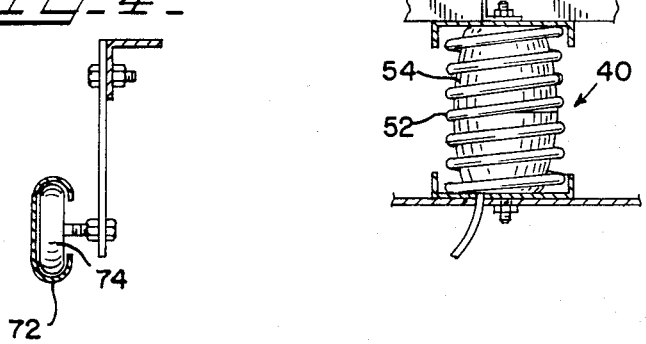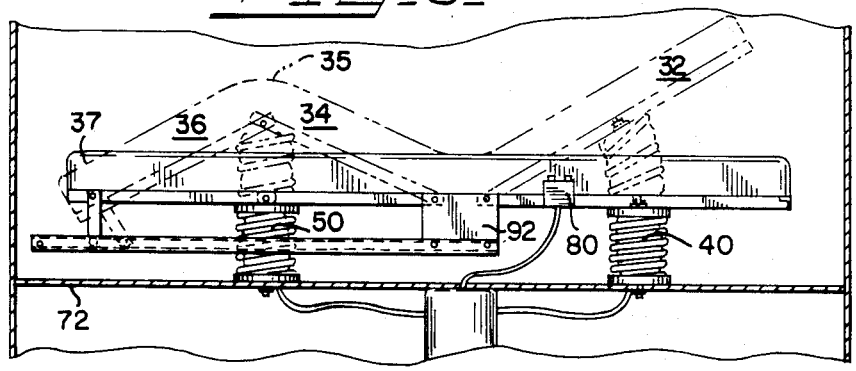

RECLINING BUNK FOR SLEEPER

BACKGROUND OF THE INVENTION

The field of the present invention is that of trucks with a sleeper compartment.

DISCLOSURE STATEMENT

It is known in the art to provide trucks with sleeper compartments. One advantage of the sleeper compartment is to allow the operator to sleep inside his truck thereby eliminating the need and expense of utilizing a motel.

On urgent long distance truck hauls, it is customary in the trucking industry to utilize two drivers. While one operator is driving the vehicle, the second operator will typically use the sleeper compartment as a place of rest or for sleeping. When the sleeper is utilized for a place of rest, often the occupant would prefer to be in a semireclining position, as opposed to a totally reclining position which would be preferable for sleep. However, current sleeper compartments do not have semireclining positions.

Another disadvantage of prior sleeper compartments is that they lack a sufficient amount of dampening between the truck body or frame and the sleeper compartment causing the sleeper occupant to feel too many of the bumps of the road.

It is readily apparent to those knowlegeable in the industry that an increase in comfort for the sleeper compartment occupant is very likely to lead to greater efficiency by making the sleeper car occupant more efficient when he returns to the driving position. An increase in comfort will also often lead to increased safety by providing the truck with a fresher and more rested driver.

SUMMARY OF THE INVENTION

To overcome the disadvantages of prior truck sleeper bed systems, a truck is provided with a reclining sleeper bed which is adjustable to various positions for operator comfort. The inventive truck sleeper bed system is also pneumatically powered by the compressed air system of the truck. Utilizing the compressed air system of a truck not only powers the reclining bed to a position desired but also supplies pneumatic dampening of the relative motion between the truck body and the sleeper bed, thereby providing an air cushioned ride for the sleeper bed occupant.

It is an object of the present invention to provide a truck which has a multipositional reclining sleeper bed system. It is also an object of the present invention to provide a truck with a multipositional reclining sleeper bed system which is pneumatically cushioned.

Other objects and advantages of the present invention will become apparent to those skilled in the art as the nature of the invention is better understood from the accompanying drawings and detailed description.

BRIEF DESCRIPTION OF THE INVENTION

FIG. 1 illustrates a truck of the present invention illustrating the major components of the truck body, sleeper compartment, and sleeper bed system;

FIG. 2 is a lower perspective view showing the frame of the sleeper bed in a totally reclining position and also illustrating in phantom the sleeper bed frame in a raised position;

FIG. 3 is a side elevational view of the sleeper bed in a totally reclining position and also illustrating in phantom the sleeper bed in a partially inclined position;

FIG. 4 is a partial sectional view illustrating the lower leg section sleeper bed track roller system;

FIG. 5 is an enlarged view of a air spring utilized in the sleeper bed illustrated in FIGS. 2 and 3.

DETAIL DESCRIPTION OF THE DRAWINGS

Referring to FIG. 1, the truck 6 of the present invention has three major components. The first component is the truck mobile chassis 10. Mounted on chassis 10 is sleeper compartment 20. Within the sleeper compartment 20 is sleeper bed system 30.

Referring to FIGS. 2 and 3 the sleeper bed system 30 has three pivoting sections. The first pivoting section is upper body or torso frame structure 32 which is pivotably connected to the sleeper compartment 20 through a mounting plate 92 attached thereto as by being bolted. The torso frame 32 is swingable from a horizontal position shown at straight line to a position at an acute angle with the horizontal position.

Longitudinally aligned and adjacent to the torso frame 32 is the lower body or pelvic-femur frame structure 34 which is also pivotably attached to the sleeper compartment 20 along mounting plate 92. Pelvic-femur frame 34 is swingable from a horizontal position to an acute angle in respect to its horizontal position and pivots towards torso frame 32.

Pivotably attached to pelvic-femur frame 34 at end 35 opposite the torso frame 32 portion is lower leg frame structure 36.

Referring to FIGS. 5, 3 and 2 air springs 40 and 50 provide the means to power the sleeper bed system to its desired position. Air spring 40 is manufactured using a surface 54 of a deformable material, typically an elastomeric type of material. Also to aid in its dampening and support characteristics, air spring 40 has a surrounding steel coil 52. The air spring 40 and 50 also isolate the sleeper bed system 30 from the chassis 10 and restrict relative motion between the chassis 10 and the sleeper bed system 30 thereby cushioning the ride.

Sleeper bed system 30 will not be completely isolated from chassis 10 (via sleeper compartment 20) since mounting plate 92 is connected with both members. However, due to pivotal relationship of the torso frame 32 and pelvic-femur frame 34 with mounting plate 92, relative movement of the frame members 32 and 34 with respect to chassis 10 will be restricted by the air springs 40 and 50.

Mechanical controller 80 selectively connects air springs 40 and 50 with the air reservoir 90 or to an atmospheric vent (not shown). Air reservoir 90 is connected with the truck compressed air system (not shown). In operation, controller 80 is used to either add or to remove air from air springs 40 and 50 to position the sleeper bed system 30 in its desired position. After the position of the sleeper bed 30 is set the air springs 40 and 50 act as pneumatic dampeners to provide an air cushion ride.

Air spring 50 is positioned in such a manner to position both the pelvic-femur frame 34 and the lower leg frame 36. The end 37 of lower leg frame 36 opposite the pelvic-femur frame 34 has projecting from its roller or rollers 74 which are constrained in track or tracks 72. This track system maintains the end 37 of a lower leg frame 36 at a predetermined elevation.

Shock absorbers (not shown) are provided on most trucks to dampen relative motion between the wheels 8 and the chassis 10. Therefore, by providing dampening between chassis 10 and sleeper bed system 30, springs 50 and 40 provide second order dampening between the sleeper bed 30 and the truck wheels 8. The second order dampening helps the sleeper bed occupant to feel less of the bumps of the road.

An advantage of the use of pneumatic springs is that no electric current is needed to change positions of the sleeper bed 30. Since no electric current is used, electric motors are not required and the operator will not drain the battery to change positions of the bed when the truck engine is shut off. The sleeper bed system 30 may be adjusted with the engine off from air stored in fluid reservoir 90.

Also, since many trucks do not have a hydraulic pump, or have a hydraulic pump which is sealed within a power steering system, the use of a hydraulic actuator to replace air springs 40 and 50 would not be advantageous. A hydraulic system would also increase the weight of the sleeper bed system by requiring large hydraulic dampeners to provide the same amount of dampening given by the lighter air springs.

Most trucks are already manufactured with an air system to power the brakes, therefore, pneumatic actuation of the sleeper would not require any major new mechanical systems for the truck. Still another advantage of the air spring is that dampening can be easily adjusted by adjusting the air pressure within the springs 40 and 50.

It will be appreciated that although air springs have been illustrated herein in connection with the invention, air bags without springs or air-adjustable shock absorbers such as those manufactured for automobiles by Delco-Remy division of General Motors Corporation would also be suitable for supporting and adjusting the position of the bunk sections.

While a few embodiments of the present invention have been explained, it will be readily apparent to those skilled in the art that other modifications can be made to the present invention without departing from the spirit and scope of this application as encompassed by the following claims.

What is claimed is:

1. A truck comprising:
   a mobile chasis;
   a sleeper compartment mounted to said chasis;
   a sleeper bed system disposed within said sleeper compartment, said sleeper bed system including:
   a mounting member attached to said sleeper compartment;
   an upper body frame structure pivotably attached at one end to said mounting member and swingable from a horizontal position to a position at an acute angle with said horizontal position;
   first pneumatic power means operatively disposed to move said upper body frame structure between desired positions and to restrict relative motion between said upper body frame structure and said mobile chasis;
   a lower body frame structure, pivotably attached at one end to said mounting member adjacent and longitudinally aligned with said upper body frame structure, said lower body frame structure being swingable from a horizontal position to an acute angle with said horizontal position and pivotable formed said upper body frame structure;
   second pneumatic power means operatively disposed to move said lower body frame structure to said desired position and to restrict relative motion between said lower body frame structure and said mobile chassis;
   a pneumatic reservoir to supply air to said first and second pneumatic power means; and control means selectively and independently controlling the air flow respectively into and out of said first and second power means.

2. A truck as described in claim 1 wherein said sleeper bed further includes a lower leg frame structure pivotably attached and longitudinally aligned with said lower body frame structure.

3. A truck as described in claim 1 wherein said first pneumatic power means includes shock absorbing means.

4. A truck as described in claim 3 wherein said first pneumatic power means further includes a mechanical spring.

5. A truck as described in claim 3 wherein said sleeper bed control means selectively connects said first pneumatic power means with said fluid reservoir and also selectively connects said first pneumatic power means with an atmospheric release.

6. A truck comprising:
   a mobile chassis;
   a sleeper compartment mounted to said chassis;
   a sleeper bed system disposed within said sleeper compartment, said sleeper bed system including:
   a torso frame pivotably attached to said sleeper compartment and swingable from a horizontal position to a position at an acute angle with said horizontal position;
   a first air adjustable means disposed between said torso frame and said sleeper compartment to move said torso frame to a desired position and to dampen relative motion between said torso frame and said chassis;
   a pelvic-femur frame pivotably attached to said sleeper compartment adjacent and longitudinally aligned with said torso frame, said pelvic-femur frame being swingable from a horizontal position to an acute angle with said horizontal position and pivotably toward said torso frame;
   a lower leg frame pivotably attached to said pelvic-femur frame at the end of said pelvic-fibular frame opposite said torso frame;
   a second air adjustable means disposed between said lower body frame and said sleeper compartment for moving said lower body frame to a desired position and dampening relative motion between said pelvic-femur frame and said mobile chassis;
   a pneumatic reservoir to supply air to said first and second air adjustable means; and
   a mechanical control means selectively independently connecting said first and second air adjustable means with said pneumatic reservoir and selectively connecting said first and second air adjustable means with an atmospheric release to provide operator control of said frames.

7. A truck as described in claim 6 wherein said sleeper bed system has said second air adjustable means connecting with pelvic-femur frame at the end of said pelvic-femur frame connecting with said lower leg frame and, wherein the end of said lower leg frame opposite said pelvic-femur frame has projecting from it rollers which are captured in a track to keep the end of said lower leg frame opposite said pelvic-femur frame at a predetermined elevation as determined by the rail.

8. A truck as described in claim 6 wherein said sleeper bed air adjustable means comprise air springs.

* * * * *